E. T. REICHERT, Jr.
WARMED STEERING WHEEL.
APPLICATION FILED NOV. 25, 1910.

1,002,754.

Patented Sept. 5, 1911.

2 SHEETS—SHEET 1.

Fig. 1,

WITNESSES
Edward Thorpe

INVENTOR
Edward. T. Reichert jr
BY
ATTORNEYS

E. T. REICHERT, Jr.
WARMED STEERING WHEEL.
APPLICATION FILED NOV. 25, 1910.

1,002,754.

Patented Sept. 5, 1911.
2 SHEETS—SHEET 2.

WITNESSES
Edw. Thorpe
H. Whiting

INVENTOR
Edward T. Reichert, Jr.
BY
ATTORNEYS

UNITED STATES PATENT OFFICE.

EDWARD T. REICHERT, JR., OF NEW YORK, N. Y.

WARMED STEERING-WHEEL.

1,002,754.     Specification of Letters Patent.     Patented Sept. 5, 1911.

Application filed November 25, 1910. Serial No. 594,034.

*To all whom it may concern:*

Be it known that I, EDWARD T. REICHERT, Jr., a citizen of the United States, and a resident of the city of New York, borough of Manhattan, in the county and State of New York, have invented a new and Improved Warmed Steering-Wheel, of which the following is a full, clear, and exact description.

This invention relates to a new and improved steering wheel with appliances for warming the same, so as to keep the operator's hands in a comfortable condition. It is a well known fact that in the case of launches, aeroplanes, or in open automobiles, without the protecting wind shield, the hands of the driver become exceedingly cold, due to the cold wind through which he is rushing.

It is therefore the object of this invention to provide means whereby the steering wheel may be warmed so that the operator may keep his hands warm.

A further object of this invention is to utilize the waste heat from the engine in such a manner that it may be circulated through the steering wheel and thus warm the same.

A still further object of this invention is to provide a steering wheel which will be warmed in a simple and efficient manner, without any unnecessary expense, and which, at the same time, will not interfere with the steering operation of the wheel.

These and further objects, together with the construction and combination of parts, will be more fully described hereinafter and set forth in the claims.

Reference is to be had to the accompanying drawings forming a part of this specification, in which similar characters of reference indicate corresponding parts in all the views, and in which—

Figure 1:
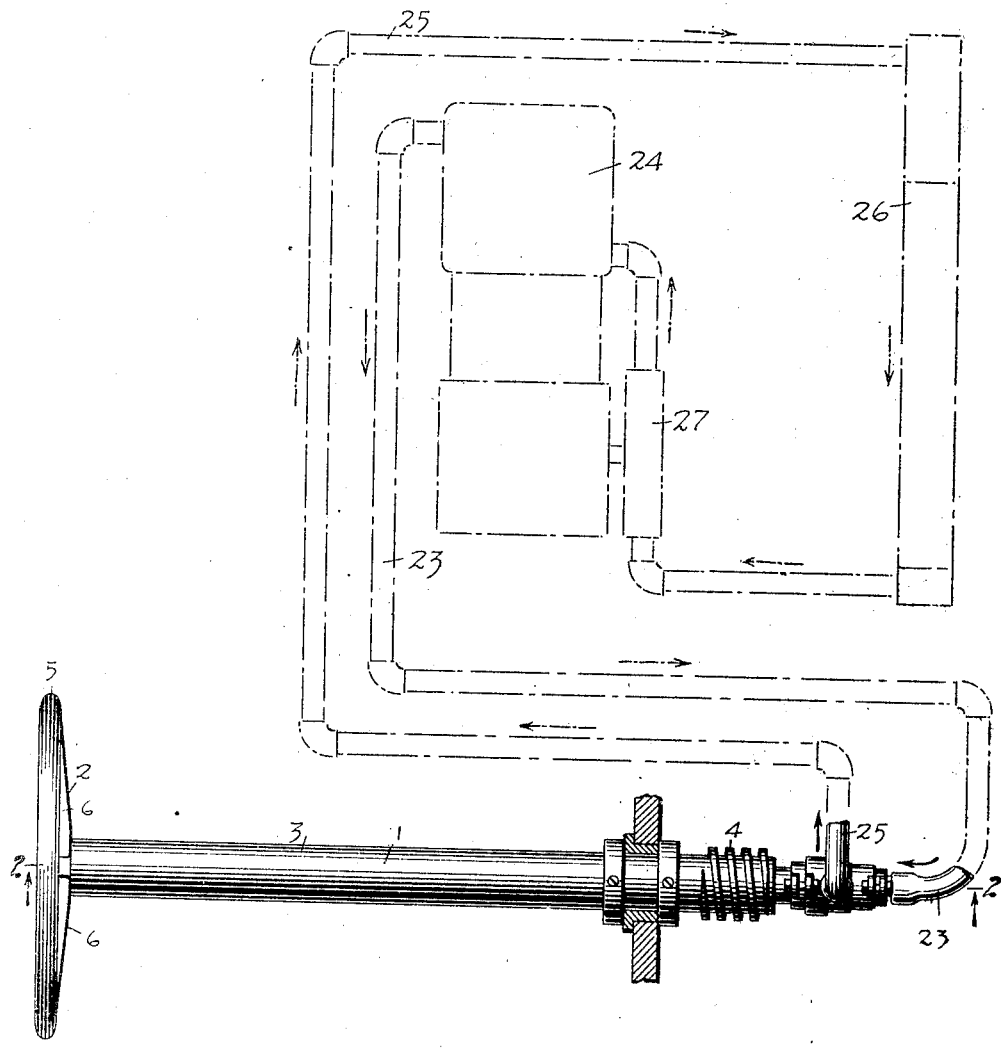
Figure 2:
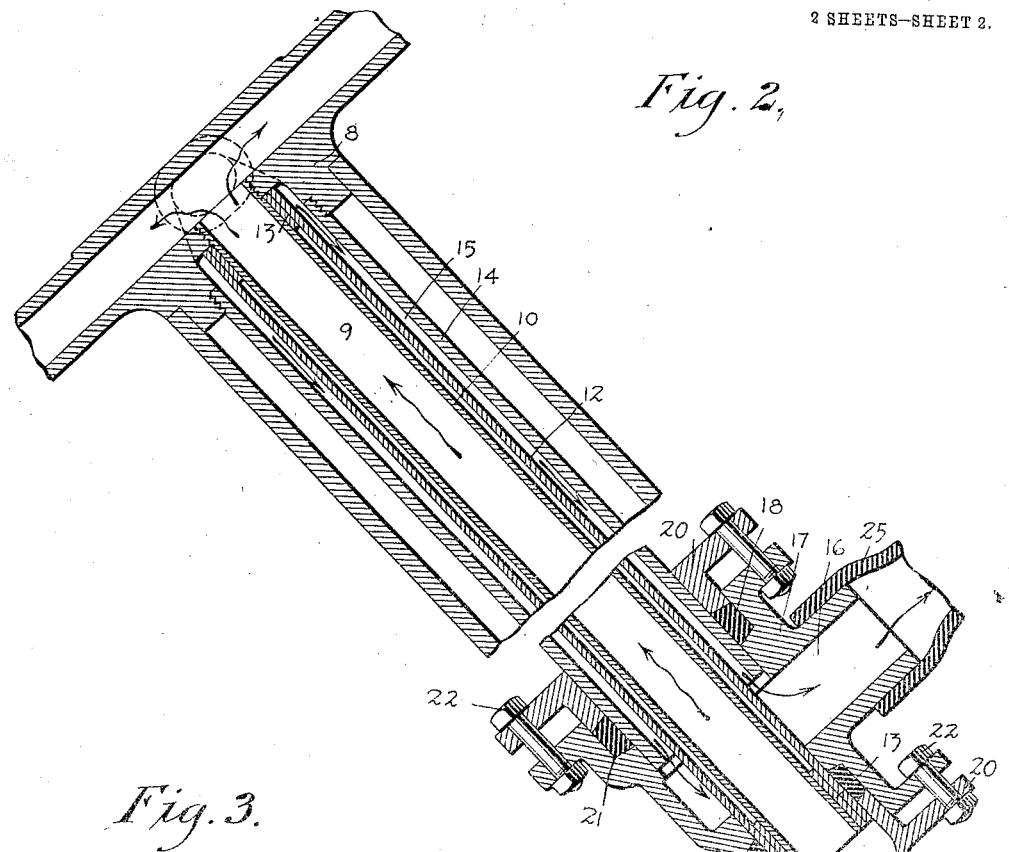
Figure 3:
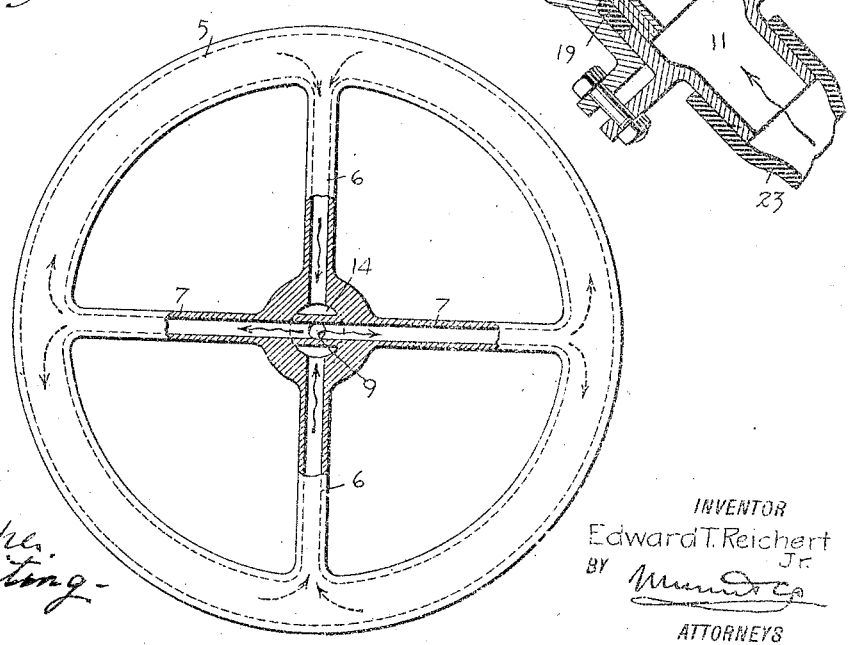

Figure 1 is a diagrammatic view illustrating my steering wheel in connection with the engine and the radiator; Fig. 2 is a fragmentary, contracted vertical section, taken longitudinally through the steering wheel shaft, and Fig. 3 is a top plan view of the steering wheel, partly broken away to show the underlying structure.

Referring more particularly to the separate parts of the device as embodied in the form shown in the drawings, 1 indicates the steering mechanism, which comprises a wheel proper 2 and a shaft 3. The latter may transmit its motion to the remaining steering mechanism in any suitable manner, as by means of a worm 4. It will be noted that the steering wheel proper 2 comprises a rim 5, spokes 6 and 7 and a hub 8. The rim 5 is preferably hollow and communicates with the spokes 7, which are also hollow, and also communicates with the interior of the spokes 6, which are likewise hollow. The spokes 7 communicate with a passage 9 formed in the steering shaft 3 in any suitable manner, as by means of a tube 10, which is connected in any suitable manner to the hub 8. This tube 10 extends the full length of the shaft 3 and projects at the lower end thereof, where its passage communicates with a passage 11. Concentrically mounted on the tube 10 is a tube 12, which is spaced apart therefrom in any suitable manner, as by means of spacing collars 13, so as to form a heat-insulating chamber therebetween. Also concentrically mounted with respect to the tubes 10 and 12 and secured to the hub 8 in any suitable manner, as by means of a screw-threaded section, is a tube 14, which is spaced apart from the tube 12, so as to form an annular passage 15. The annular passage 15 communicates at its lower end with a passage 16 in a joint 17, and also communicates at its upper end with the interior of the spokes 6. Packing joints may be provided at 18 and 19, of any suitable character, such as those provided by the glands 20, which squeeze between themselves and the joint 17 the packing material 21, when tightened by means of bolts 22.

The passage 11, which may be termed the inlet of the steering wheel as a whole, is connected in any suitable manner, as by means of a pipe 23, to a source of heat 24, which in this case is indicated as the outlet of the water jacket of the gasolene engine. Any other suitable source of heat might be provided, such as the exhaust from a steam engine, if the conveyance be propelled by steam, or even the exhaust from the gas engine itself.

The passage 16, which may be termed the outlet of the steering wheel system, is connected in any suitable manner, as by means of a pipe 25, to the intake side of the source of heat 24; that is to say, to the intake side of the water jacket. The usual radiator 26 and any suitable type of pump 27 may be provided in this circuit.

The operation of the device will readily be understood when taken in connection with the above description. The water heated in the water jacket of the engine enters by means of the pipe 23 into the passage 11, where it passes up through the central passage 9 and divides into two streams which go in the direction of the arrows in Figs. 2 and 3, into the spokes 7. From the spokes 7 the heating fluid passes into the rim 5, where it again divides and goes in opposite directions until it meets at the junction of the spokes 6 with the rim 5. Here it enters the passages in the spokes 6 and passes down through the passage between the tubes 12 and 14; from this passage 15 it passes through the outlet 16 into the pipe 25, where it proceeds to the radiator, where it is cooled and pumped back into the water jacket by means of the pump 27.

It will be seen that there is provided a simple and efficient system, which will keep the steering wheel warm at all times, adding greatly to the comfort of the operator.

While I have shown one embodiment of my invention I do not wish to be limited to the details thereof, but desire to be protected in the various changes, alterations and modifications which I may make within the scope of the appended claims.

Having thus described my invention, I claim as new and desire to secure by Letters Patent:

1. The combination with a steering wheel having passages therein, of a tube secured to the said steering wheel and having a passage therethrough communicating with the passages in said steering wheel, a tube mounted on said first-mentioned tube and spaced apart therefrom, so as to form a heat-insulating chamber, and a third tube concentrically mounted with respect to said first-mentioned tube and spaced apart from said second-mentioned tube, so as to form an annular passage therebetween, which communicates with the passages in said steering wheel.

2. The combination with a steering wheel having passages therein, of a tube secured to the said steering wheel and having a passage therethrough communicating with the passages in said steering wheel, a tube mounted on said first-mentioned tube and spaced apart therefrom, so as to form a heat-insulating chamber, a third tube concentrically mounted with respect to said first-mentioned tube and spaced apart from said second-mentioned tube, so as to form an annular passage therebetween, which communicates with the passage in said steering wheel, and a fourth tube concentrically mounted with respect to said above-mentioned tubes and adapted to transmit the steering strain from said steering wheel.

In testimony whereof I have signed my name to this specification in the presence of two subscribing witnesses.

EDWARD T. REICHERT, Jr.

Witnesses:
W. A. TOWNER, Jr.,
JOSEPH FALKE.